Nov. 14, 1939.  C. A. ROYS  2,179,671
APPARATUS FOR BAKING BREAD
Filed Nov. 25, 1938  4 Sheets-Sheet 1
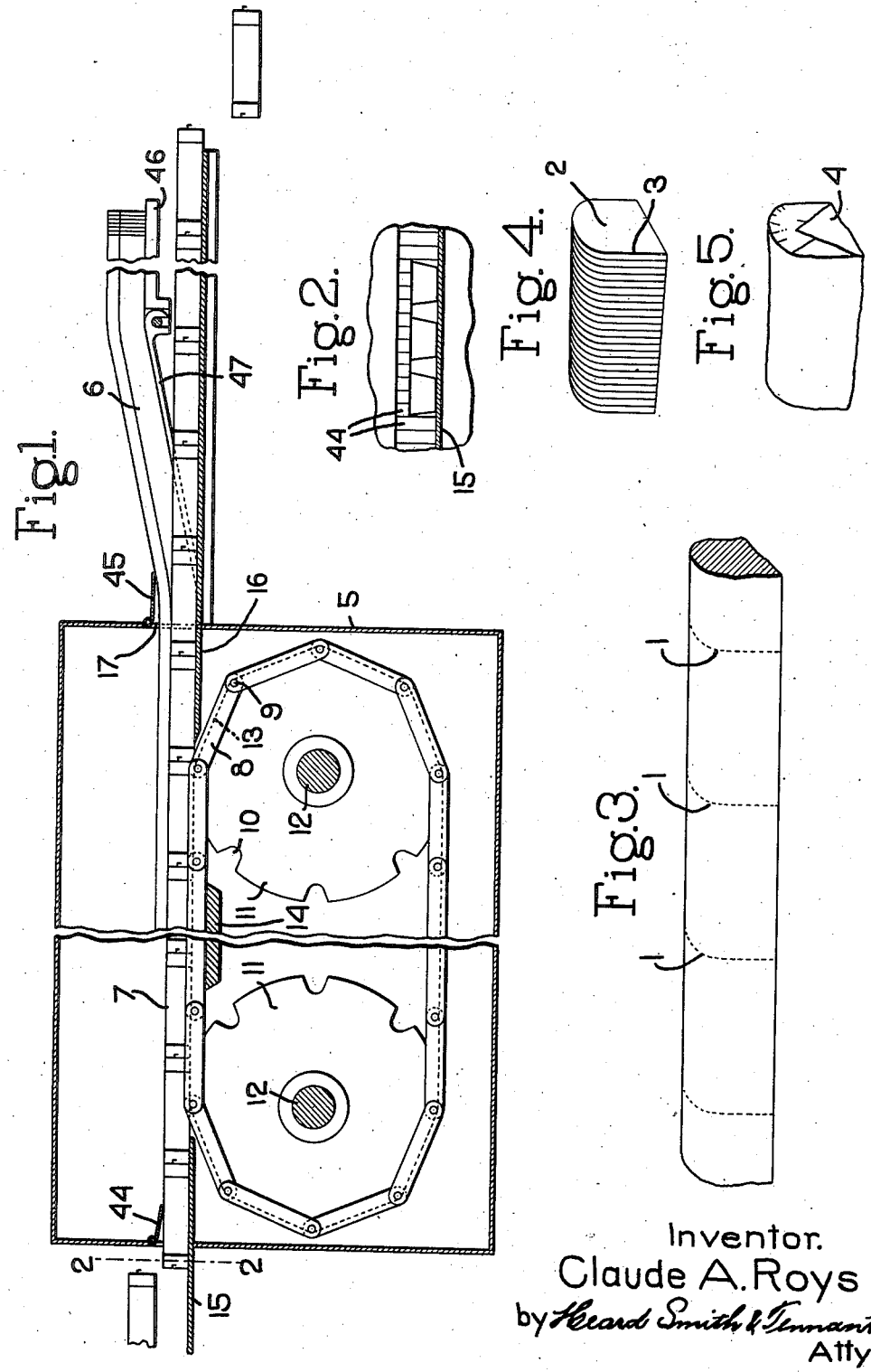
Inventor.
Claude A. Roys
by Heard Smith & Tennant.
Attys.

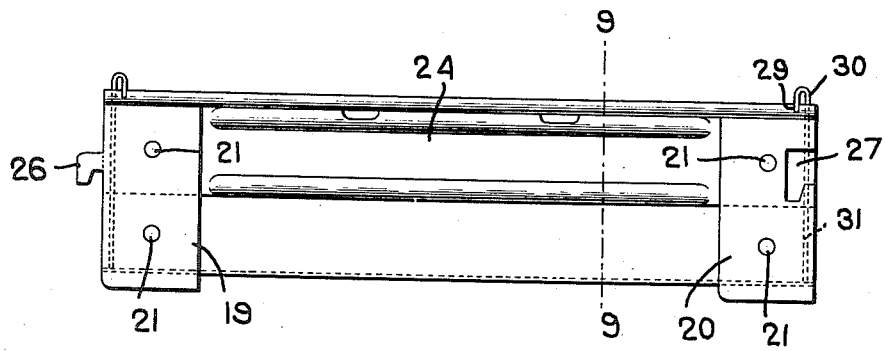
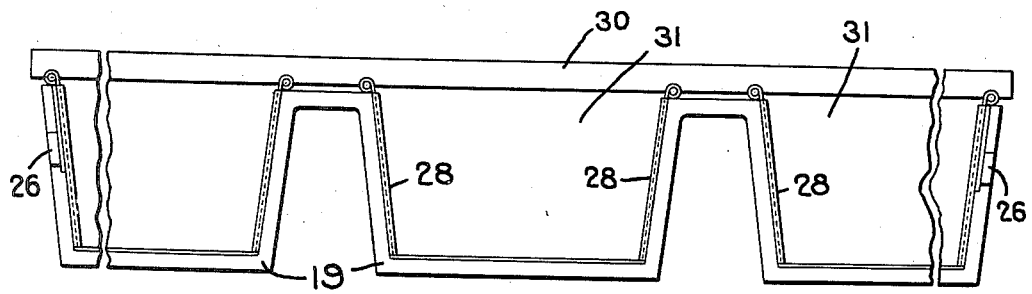
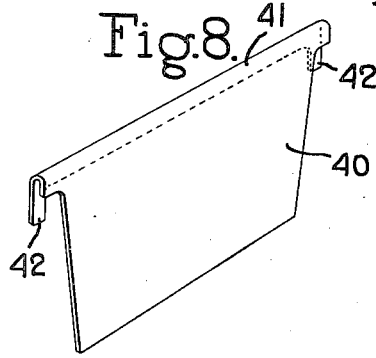

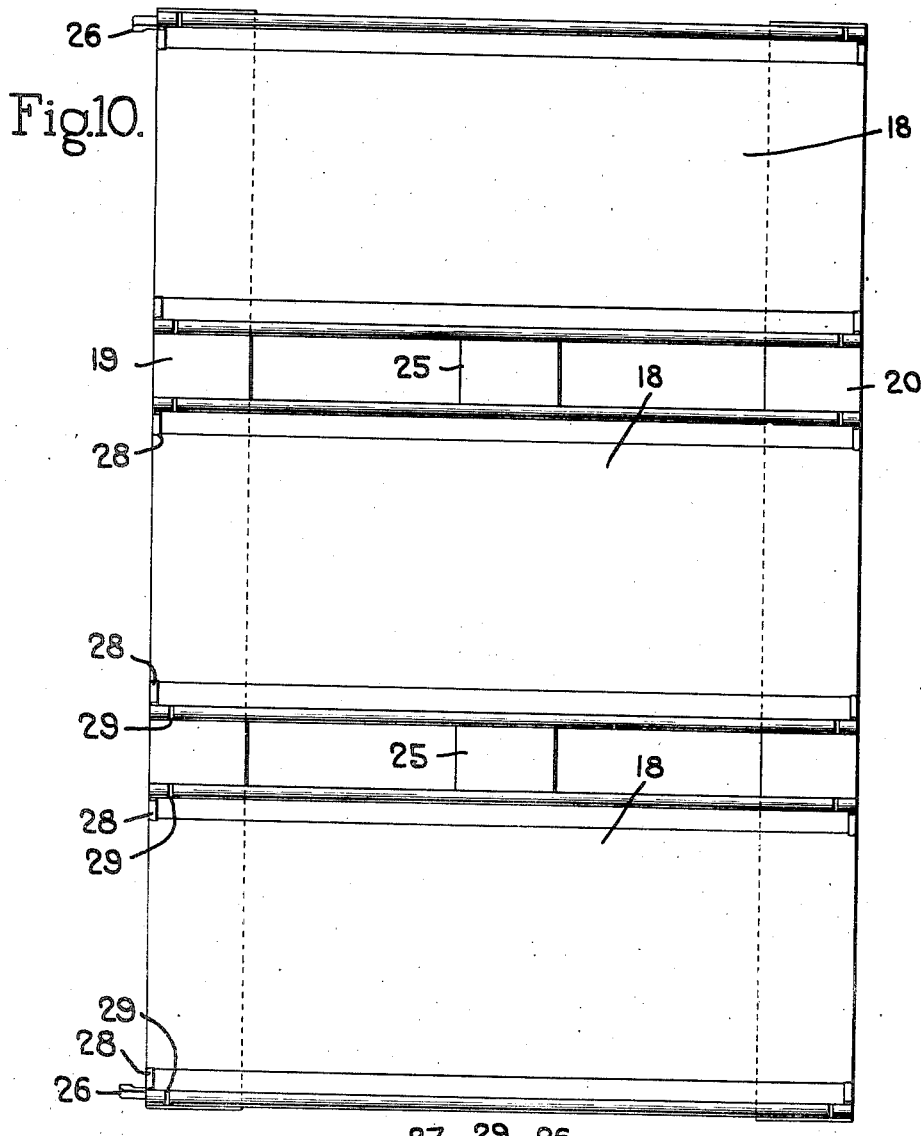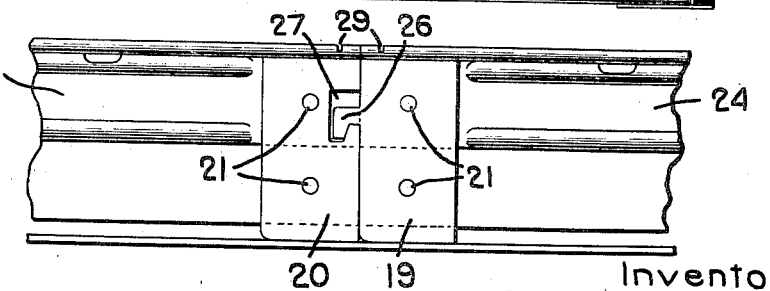

Nov. 14, 1939.    C. A. ROYS    2,179,671
APPARATUS FOR BAKING BREAD
Filed Nov. 25, 1938    4 Sheets-Sheet 4

Inventor.
Claude A. Roys
by Heard Smith & Tennant.
Attys.

Patented Nov. 14, 1939

2,179,671

UNITED STATES PATENT OFFICE 2,179,671

APPARATUS FOR BAKING BREAD

Claude A. Roys, Wellesley Hills, Mass.

Application November 25, 1938, Serial No. 242,245

14 Claims. (Cl. 107—56)

This invention relates to an apparatus for baking a continuous bar of bread having a cross section required for a standard loaf of bread and which may be cut into unit sections each without end crusts and of the standard weight prescribed by statute or adopted by the baker and plainly marked upon the loaf of bread or its wrapper.

Loaves of bread baked and sold commercially are universally required by law to be of a standard weight with a standard prescribed by the statute or with a standard adopted by the baker and plainly marked as aforesaid upon the loaf of bread or its wrapper.

Heretofore these loaves of bread are universally baked each as a unit article with the entire outer surface including the ends of the loaf covered by a crust formed in the baking operation. Whether the loaves of bread, as now extensively customary, are furnished in sliced form or are thereafter cut into slices by the user, the two end slices, the outer surfaces of which are covered with a usually thick and hard crust, are generally discarded or thrown away, thus resulting in an enormous waste. This wastage represents approximately a tenth of the total weight of the standard loaf and when the enormous quantity of baked bread made and sold commercially is considered, it will be recognized that the total daily waste reaches a tremendous figure.

The present invention provides an apparatus which has for its object to reduce to a minimum, and under the most efficient conditions practically to eliminate, this wastage and, furthermore, to do this without increasing-and even by reducing the cost of manufacture to the baker.

The apparatus of this invention, therefore, has for its object to eliminate the end crust slices and to produce a loaf of bread of standard weight all slices of which have the same characteristics and desirability to the consumer.

The invention has as its object to produce a substantially continuous or endless bar of baked bread having the same characteristics throughout its length and which may thereafter be cut into loaves of standard weight having no end crusts.

The nature and objects of the invention will appear more fully from the accompanying description and drawings and will be particularly pointed out in the claims.

In the drawings:

Fig. 1 is a view in side elevation and partially in cross section and largely diagrammatic of a simple form of apparatus embodying the invention.

Fig. 2 is a detail chiefly in front end elevation and in cross section taken on the line 2—2 of Fig. 1.

Fig. 3 is a view in perspective of a portion of a continuous or substantially endless bar of baked bread with the position of individual loaves to be formed therefrom indicated by the dotted lines.

Fig. 4 is a view in perspective of a standard commercial loaf of bread weighing, for example, twenty ounces and divided into twenty-three slices.

Fig. 5 is a view in perspetcive of the loaf of bread shown in Fig. 4 provided with a moisture-resistant wrapper.

Fig. 6 is a side elevation of a multi-pan unit with removable end plates in place and employed in a preferred form of the apparatus of the invention.

Fig. 7 is an end view partly broken away of the construction shown in Fig. 6.

Fig. 8 is a perspective view of a removable end plate for a single pan.

Fig. 9 is a detail in vertical cross section taken on the line 9—9 of Fig. 6.

Fig. 10 is a top plan view of the construction shown in Figs. 6, 7 and 9 with the end plates removed.

Fig. 11 is a side elevation of portions of two pan units coupled together.

Figure 12:
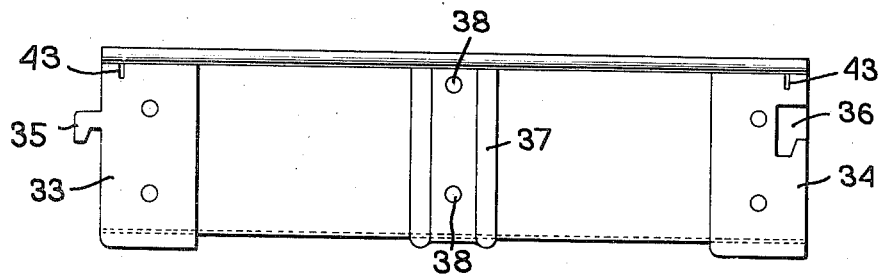
Fig. 12 is a side elevation of a single pan unit embodying the invention.

The product produced by the use of the apparatus and the practice of the method of this invention is a continuous or substantially endless bar of baked bread of standard cross section and having an uncompressed top crust. A section of this product is indicated in Fig. 3. It may be composed of any of the usual or suitable materials employed in bread and made according to any usual or suitable recipe. The essential characteristic of this bar of baked bread is that the entire core is baked in continuity as well as the crusted surface with the cross section substantially uniform and of the standard shape required throughout the entire length of the bar.

This bar of baked bread as or after it is produced is then cut into loaves of standard weight, the lines of cut to form these loaves being indicated at 1 in Fig. 3. The sections forming the loaves may be cut as they are formed or after they are formed into slices so that the final loaf may be in a single piece or in the sliced form now commonly furnished to the trade. The latter form of sliced loaf is shown in Fig. 4. It will be seen that the loaf comprises a core or central portion 2 and a circumferential crust 3 extending entirely around the circumference or periphery of the loaf and uncompressed at the top so that the cross-sectional shape of the loaf is that commonly in use. The essential characteristic of the loaf is that the entire core is baked in continuity and extends between the two end faces of the loaf so that these two end faces are baked in situ without crusts. Thus the ends of the core appearing at the end faces of the loaf are uncrusted and homogeneous with the body of the core. When the loaf is cut into slices, as indicated in Fig. 4, each one of the slices has the same characteristics and each face of each slice has the same characteristics.

The loaf of bread, either sliced or unsliced, is furnished to the customer wrapped to protect it from impurities and in the former case also to hold the slices in contact with each other and in both cases to protect the end faces of the loaf and maintain these end faces in condition. For this purpose the loaf may be wrapped as shown in Fig. 5 with a suitable wrapper 4 of moisture-resistant material such as commonly employed for wrapping bread.

The apparatus illustrated for disclosing a simple and preferred form of the invention comprises an oven 5 indicated diagrammatically. This oven may be made of any desired size, of any suitable materials, and heated by any suitable means to secure the proper baking. The dough is baked into the endless bar 6 as it passes through the oven contained in an endless pan trough 7. This pan trough is supported upon and progressively carried through the oven by the upper run of an endless conveyor presenting a traveling flat surface extending across the oven. The endless conveyor illustrated is shown as entirely mounted within the oven. It is indicated as made up of links 8 pivoted together at 9 and carrying rollers fitting in the grooves 10 of sprocket wheels 11 carried upon shafts 12 rotated by any suitable means at the required speed. A set of sprocket wheels and links 8 are located at each side of the oven and the links are connected by plates 13 which cause the upper run of the conveyor to present a substantially continuous flat surface. The conveyor at its upper run may be supported by and travel over a suitable fixed support 14 between the sprocket wheels. A pan-supporting table 15 is mounted at the front of the oven, extends through the opening up close to the upper run of the conveyor and forms a substantial continuation of the flat surface of the conveyor. A similar pan table 16 is mounted at the rear of the oven extending through the opening 17 and likewise forming a substantial continuation of the flat surface of the upper run of the conveyor.

The endless pan troughs such as 7 passing through the oven are made up of pan units and each pan unit may consist of a single pan or of two or more pans side by side. There may also be as many of these pan troughs carried through the oven by the endless conveyor as are desired and found practical, the only limit being the width of the oven. As examples of preferred constructions, there are illustrated herein pan units consisting of a single pan and multi-pan units consisting of three pans.

A multi-pan unit is illustrated in Figs. 6 to 11, inclusive. This unit is shown as made up of three similar, rectangular, open-top, open-end pans 18. These are made of suitable heavy sheet metal of a cross section corresponding to the sides and bottom of an ordinary loaf of bread and of any desired convenient length. These pans are rigidly secured together side by side in spaced, parallel relation and are suitably braced to maintain their shape and relative position so as to withstand the more or less rough handling to which such an article is subjected. For this purpose rigid reinforcing braces 19 and 20 extend continuously, one at each end of the pan unit, around the side walls and bottoms of and between the pans and are rigidly secured in place. These braces are shown as made of cast metal but may be made in any suitable manner. They are also shown as riveted in place as by rivets 21 but they may be welded or otherwise suitably secured to the pan walls. These braces are preferably flush with the ends of the pan walls. But, in any event, the construction is such that when the units of the series are placed in abutting relation end to end, there will be formed a plurality of parallel, continuous pan troughs. Other suitable strengthening and bracing features may be provided. For example, the upper edges of the side wall of each pan are shown bent at 22 around a heavy metal rod 23 and corrugated stiffening plates 24 are shown secured to the side walls of the pans. Such stiffening plates may be employed wherever found necessary and are illustrated as secured to the outside walls of the outer pans. The plates 24 have their corrugated portion flattened out at the ends and these ends extend between the braces 19 and 20 and the side walls of the pans which may be cut away for that purpose. Additional transverse braces 25 may also be employed between and connecting adjacent side walls of the pans. Suitable means are provided for detachably securing the pan units together in endwise abutting relation to form the plurality of parallel, continuous pan troughs. A simple complemental means for that end is shown in that the braces 19 are provided with projecting hooks 26, while the braces 20 are provided with complemental hook-engaging recesses 27 with the cooperating faces of the hooks and recesses being inclined. Thus when the hooked end of one pan unit is inserted and dropped into the recessed end of another pan unit, the two units are firmly coupled together in abutting relation, as shown in Fig. 11.

In preparing for the baking operation, it is necessary that the dough should be given an opportunity to rise, which requires a considerable time. For this purpose the pan units are provided with temporary removable end plates so that each pan may be supplied with dough with these end plates in position and the pan units with the contained dough placed individually in a room and subjected to the desired temperature for the required time. In the construction illustrated, these removable end plates may be provided one for each end of each pan or a single pan unit having plate sections fitting the ends of the pans. The side walls of each pan at each end are provided with small inward projecting ribs 28, preferably struck up from the metal of the pan, and the upper edges of the side walls of the pan are provided with notches 29. The end plates when in position have their side edges abutting against the ribs 28. The multi-plate unit illustrated is preferably formed entirely of sheet metal, the upper edge of which is curled over to form a stiffening rib 30 extending entirely across the multi-pan unit and with the edge of this rib fitting into the notches 29 and with the metal depending from the rib forming the plate sections 31.

The small ribs 28 on the sides of the pans at the ends make very slight indentations in the bar of baked bread and, as the sides of the pans preferably flare outward, they do not interfere with the separation vertically of the baked bar from the continuous pan trough.

Figure 13:
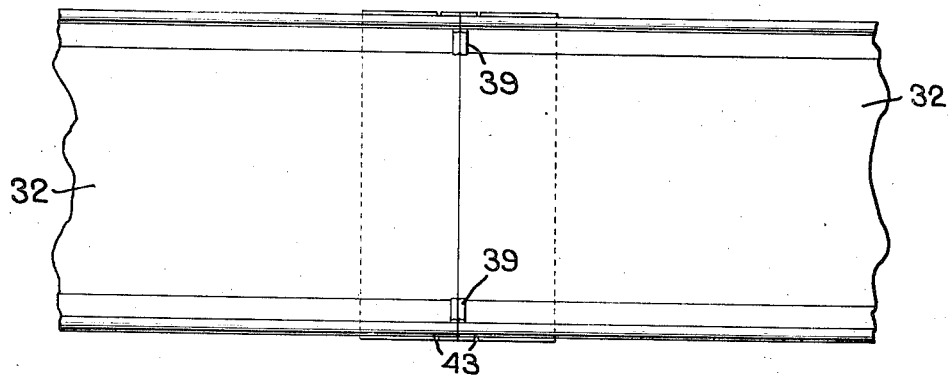
Fig. 13 is a top plan view of portions of two single pan units coupled together.
Figure 14:
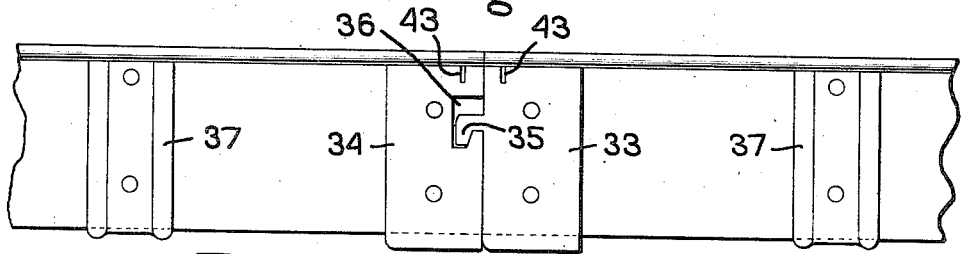
Fig. 14 is a side elevation of the construction shown in Fig. 13.
Figure 15:
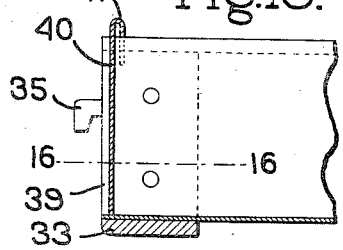
Fig. 15 is a detail in vertical cross section of one end of a single pan unit with the end plate in place.
Figure 16:
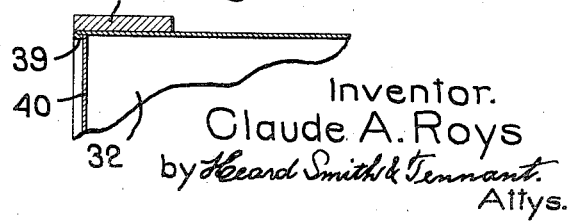
Fig. 16 is a detail in horizontal cross section taken on the line 16—16 of Fig. 15.

A single pan unit is illustrated in Figs. 12 to 16, inclusive, and is constructed on a similar principle to that already described. The single pan unit 32 is provided at each end with the rigid braces 33 and 34 having the hooked projections and complemental recesses 36 already described. An intermediate, corrugated bracing or reinforcing member 37 is shown surrounding the side and bottom walls of the pan intermediate its length and secured to the pan by rivets 38. The side walls of the pans are provided with small ribs 39 as before. In this case single, temporary end plates such as shown in Fig. 8 are employed. These end plates 40 are also illustrated as made of sheet metal bent at the top to form the stiffening rib 41 and provided with projections 42 extending laterally therefrom and adapted to fit over the sides of the pan and into notches 43 formed in the stiffening braces 33 and 34. Single end plates such as shown in Fig. 8 may be used in the multi-pan unit but in this case the projections 42 will not be employed and the edges of the stiffening rib will fit into the notches 29.

The pan units, which may be single pan units or multiple pan units or both, are provided to the extent required by the size of the baking operation to be performed. The dough prepared according to the usual methods is placed in the several pan units with the end plates in position and then these dough-containing pan units, preferably placed on suitable carriages, are taken to a room where the temperature is such as to enable the raising of the dough to take place. When the dough has raised, the pan units are brought to the front of the oven and similar pan units are coupled together on the table 15, the adjacent end plates are removed to allow the raised dough in adjacent pans to merge and the coupled units are shoved along the table 15 onto the endless conveyor and carried thereby through the oven. The raised dough merges into a continuous bar in the continuous pan trough formed by the coupled pan units. The size of the oven, the temperature, and the speed of the endless conveyor are correlated so that when the rear of the oven is reached, the baking process is completed and a continuous bar of baked bread progressively emerges from the oven.

Preferably the entrance opening of the oven is provided with narrow, pivoted flaps 44 which ride upon the top of the pan units and swing down between adjacent rows of pan units so as substantially to close the opening, as shown in Fig. 2. Similar flaps 45 are provided at the exit opening 17.

As the baking operation is completed, the continuous bar of bread must be separated from the pan trough so that the pan units may be disconnected, resupplied with dough, and the operation continued. Any suitable means may be provided for thus separating the baked bar of bread from the pan trough. In the construction illustrated in Fig. 1, a supplemental bread table 46 is mounted above the table 16 at the rear of the oven and this table has pivotally mounted at its forward edge a series of shunt plates 47, the forward ends of which rest upon the bottom of the pan troughs and act to separate progressively from the pan troughs and elevate to the table 46 the baked bars of bread as they are progressively delivered from the oven by the pan troughs. After the pan trough thus emptied passes further along the table 16, the pan units are detached. In Fig. 1 at the front of the oven a pan unit is shown about to be coupled onto the series passing through the oven and, at the extreme right, an empty pan is shown uncoupled from the series.

After the bar of baked bread is delivered onto the table 46, it is cut into the required standard loaf sections and may there be sliced by suitable slicing machinery.

The weight of the series of pan units extending through the oven should be sufficient to overcome any resistance offered to the action of the elevating shunt plate in separating the bar of baked bread from the pan trough as it emerges from the oven and sufficient to prevent any slippage between the conveyor and pan units, but the surface of the endless conveyor may be provided with frictional means, if desired, to insure the delivery of the series of pan units.

Having thus described the invention, what is claimed as new, and desired to be secured by Letters Patent, is:

1. Bread baking apparatus comprising a series of similar rectangular pans open at both ends and the top and means for detachably connecting the said pans end to end in abutting relation to form a continuous pan trough.

2. Bread baking apparatus comprising a series of similar rectangular pans open at both ends and the top, rigid reinforcing braces surrounding exteriorly the bottom and side walls of each pan at each end thereof and complemental interlocking means on the braces of each pan for detachably connecting the said pans end to end in abutting relation to form a continuous pan trough.

3. Bread baking apparatus comprising a series of similar rectangular pans open at both ends and the top, rigid reinforcing braces surrounding exteriorly the bottom and side walls of each pan at each end thereof, hooks projecting from the brace at one end at the outer sides of each pan and complemental hook-engaging recesses in the brace at the other end of each pan for detachably connecting the said pans end to end in abutting relation to form a continuous pan trough.

4. Bread baking apparatus comprising a series of similar rectangular pans open at both ends and the top, means for detachably connecting the said pans end to end in abutting relation to form a continuous pan trough and end plates removable through the open tops of the pans for temporarily closing the ends of the pans.

5. Bread baking apparatus comprising a series of similar rectangular pans open at both ends and the top, small inward projecting ribs in the side walls of each pan at each end thereof, end plates shaped to fit closely against the sides and bottom of each pan and to abut against said ribs to form removable temporary end closures, and means for detachably connecting the said pans end to end in abutting relation to form when the end plates are removed a continuous pan trough.

6. A pan unit for a bread baking apparatus of a rectangular shape open at both ends and the top, the side walls of the pan at each end having small inward projecting ribs, end plates shaped to fit closely against the sides and bottom of the pan and to abut against said ribs and form removable temporary end closures, a stiffening rib extending arcoss the top of each end plate, and means for engaging the top of each end plate with the pan to prevent inward movement of the end plates.

7. A multi-pan unit for use in baking continuous bars of bread comprising a plurality of similar rectangular open-top and open-end pans rigidly secured together side by side in spaced parallel relation, a rigid reinforcing brace extending continuously around the side walls and bottoms of the pans and between the pans at each end thereof, and complemental fastening means at the ends of the unit acting to enable similar units to be secured together detachably end to end in abutting relation to form a plurality of parallel continuous pan troughs.

8. A multi-pan unit for use in baking having the construction defined in claim 7, together with a pair of end plate units for temporarily closing the ends of the pans, each unit comprising a top stiffening rib and plate sections shaped to fit closely against the sides and bottoms of the respective pans and means for interengaging the pan unit and end plate units to retain the ends of the pans closed until the end plate units are removed through the tops of the pans.

9. A multi-pan unit for use in baking continuous bars of bread comprising a plurality of similar rectangular open-top and open-end pans rigidly secured together side by side in spaced parallel relation, a rigid reinforcing brace extending continuously around the side walls and bottoms of the pans and between the pans at each end thereof, hooks projecting from the brace at one end at the outer sides of the unit and complemental hook-engaging recesses in the brace at the other end to enable similar units to be secured together detachably end to end in abutting relation to form a plurality of parallel continuous pan troughs.

10. Bread baking apparatus comprising an oven, an endless conveyor the upper run of which presents a traveling flat surface extending within and across the oven, pan tables at the front and rear of the oven forming substantially continuations of the flat surface of the conveyor, and a series of similar rectangular pans open at the top, removable end closures for the ends of the pans, means for detachably connecting the pans end to end in abutting relation, the said pans when thus connected with the end closures removed and supported on the said tables and conveyor forming a continuous pan trough extending through the oven and traveling with the conveyor with the continuity of the pan trough maintained by attaching pans at the front and detaching pans at the rear of the oven.

11. Bread baking apparatus comprising the construction defined and operating as in claim 10, together with a supplemental bread table above the pan table at the rear of the oven and means acting to separate progressively from the pan trough and to elevate to the bread table the baked bar of bread as it is progressively delivered by the pan trough traveling on and with the conveyor.

12. Bread baking apparatus comprising the construction defined and operating as in claim 10, together with a supplemental bread table above the pan table at the rear of the oven and a shunt plate extending forward and downward from the bread table to the bottom of the pan trough acting to separate progressively from the pan trough and to elevate to the bread table the baked bar of bread as it is progressively delivered by the pan trough traveling on and with the conveyor.

13. Bread baking apparatus comprising an oven, an endless conveyor the upper run of which presents a traveling flat surface extending within and across the oven, a pan table at the front of the oven forming substantially a continuation of the flat surface of the conveyor, a series of similar rectangular pans open at both ends and the top detachably connected end to end in abutting relation and supported on the said table and conveyor to form a continuous pan trough extending through the oven and traveling with the conveyor with the continuity of the pan trough maintained by attaching pans at the front and detaching pans at the rear, a bread table at the rear of the oven and means acting to separate progressively from the pan trough and to guide it to the bread table the baked bar of bread as it is progressively delivered by the pan trough.

14. Bread baking apparatus comprising an oven, an endless conveyor the upper run of which presents a traveling flat surface extending within and across the oven, a pan table at the front of the oven forming substantially a continuation of the flat surface of the conveyor, a series of similar rectangular pans open at both ends and the top detachably connected end to end in abutting relation and supported on the said table and conveyor to form a continuous pan trough extending through the oven and traveling with the conveyor with the continuity of the pan trough maintained by attaching pans at the front and detaching pans at the rear, and means acting to separate progressively the pan trough and the baked bar of bread at the rear of the oven.

CLAUDE A. ROYS.